(12) United States Patent
Brinskele

(10) Patent No.: US 9,973,920 B2
(45) Date of Patent: May 15, 2018

(54) MANAGING MULTIPLE COMMUNICATION PROFILES AT A MOBILE DEVICE

(71) Applicant: Michael Brinskele, Rocklin, CA (US)

(72) Inventor: Michael Brinskele, Rocklin, CA (US)

( * ) Notice: Subject to any disclaimer, the term of this patent is extended or adjusted under 35 U.S.C. 154(b) by 0 days. days.

(21) Appl. No.: 14/933,769

(22) Filed: Nov. 5, 2015

(65) Prior Publication Data

US 2016/0174064 A1 Jun. 16, 2016

Related U.S. Application Data

(60) Provisional application No. 62/091,804, filed on Dec. 15, 2014.

(51) Int. Cl.

| | |
|---|---|
| *H04W 8/20* | (2009.01) |
| *H04L 29/08* | (2006.01) |
| *H04W 4/02* | (2018.01) |
| *H04L 29/06* | (2006.01) |
| *H04W 8/18* | (2009.01) |

(52) U.S. Cl.
CPC .............. *H04W 8/20* (2013.01); *H04L 67/303* (2013.01); *H04W 4/023* (2013.01); *H04L 63/102* (2013.01); *H04W 8/18* (2013.01)

(58) Field of Classification Search
CPC ... H04L 67/306; H04L 63/102; H04L 67/303; H04M 3/00; H04W 4/02; H04W 8/18; H04W 8/20; H04W 4/023; H04W 4/00
See application file for complete search history.

(56) References Cited

U.S. PATENT DOCUMENTS

| | | | | |
|---|---|---|---|---|
| 2006/0293065 A1* | 12/2006 | Chew | ..................... | G06Q 30/02 |
| | | | | 455/456.3 |
| 2011/0053574 A1* | 3/2011 | Rice | ...................... | H04M 1/006 |
| | | | | 455/418 |
| 2012/0033610 A1* | 2/2012 | Ring | ..................... | H04L 67/141 |
| | | | | 370/328 |
| 2013/0045758 A1* | 2/2013 | Khorashadi | ........... | H04W 4/001 |
| | | | | 455/456.3 |

* cited by examiner

*Primary Examiner* — Charles Appiah
*Assistant Examiner* — Margaret G Mastrodonato
(74) *Attorney, Agent, or Firm* — Perkins Coie LLP

(57) ABSTRACT

Systems and methods for performing actions associated with multiple communication profiles generated for a user of a mobile device are described. In some embodiments, a communication alias system generates multiple, distinct, communication profiles for the user of the mobile device, where a communication profile is a distinct profile associated with the user of the mobile device and includes a unique communication address to which communications are directed. The communication alias system may perform actions associated with providing information to the user of the mobile device via a selected communication profile for the user of the mobile device.

18 Claims, 10 Drawing Sheets

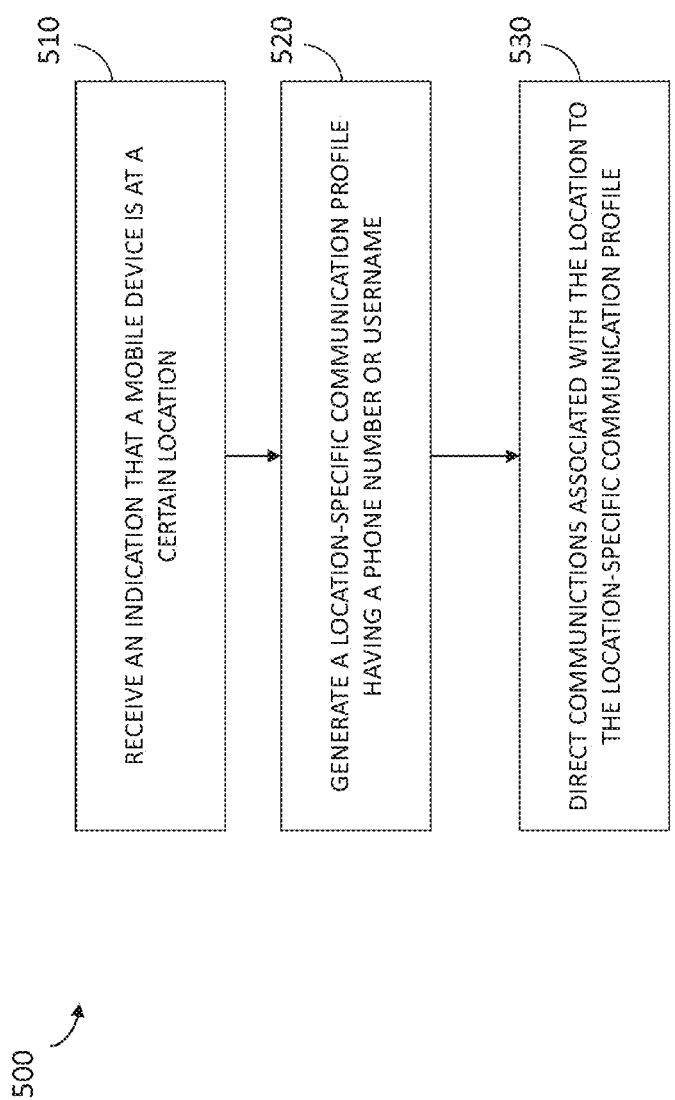

MANAGING MULTIPLE COMMUNICATION PROFILES AT A MOBILE DEVICE

CROSS REFERENCE TO RELATED APPLICATIONS

This application claims priority to U.S. Provisional Patent Application No. 62/091,804, filed on Dec. 15, 2014, entitled MULTIPLE CONTACT ALIAS SYSTEM AND PERFORMING ACTIONS UTILIZING SAME, which is hereby incorporated by reference in its entirety.

BACKGROUND

Mobile devices (e.g., smart phones, tablets) provide different mechanisms via which users communicate with other users. For example, a mobile device may provide a user with voice communication applications (e.g., for phone calls), text or instant messaging applications (e.g., for text or instant messaging conversations), social network applications, and other applications or programs that enable a user to receive and send textual, visual, or auditory information over a network from/to other users, such as a telecommunications network and/or the Internet.

Typically, a user of a mobile device is associated with a single address or phone number for a given communication mechanism. For example, the user may have a single phone number via which his/her mobile device sends and receives voice communications and text messages, a single username via which his/her mobile device sends and receives application-specific messages, and so on.

Use of a single address or number, however, may result in various annoyances and other drawbacks associated with using a mobile device, such as the receipt of unwanted messaging from advertisers, the comingling of communications associated with a user's personal and professional lives, and/or the retention of access to the user for obsolete or irrelevant entities.

BRIEF DESCRIPTION OF THE DRAWINGS

FIG. 5 is a flow diagram illustrating a method of facilitating temporary communications for a user of a mobile device.

DETAILED DESCRIPTION

Overview

Systems and methods for performing actions associated with multiple communication profiles generated for a user of a mobile device are described. In some embodiments, a communication alias system generates multiple, distinct, communication profiles for the user of the mobile device, where a communication profile is a distinct profile associated with the user of the mobile device and includes a unique communication address to which communications are directed. The communication alias system may perform actions associated with providing information to the user of the mobile device via a selected communication profile for the user of the mobile device.

For example, the communication alias system may direct messaging and alerts to specific communication profiles associated with the messaging (or, senders associated with the messaging), may generate communication profiles that are location and/or time dependent (e.g., temporary profiles), may enable third-party provisioning of communication profiles, and so on.

The systems and methods will now be described with respect to various embodiments. The following description provides specific details for a thorough understanding of, and enabling description for, these embodiments of the system. However, one skilled in the art will understand that the system may be practiced without these details. In other instances, well-known structures and functions have not been shown or described in detail to avoid unnecessarily obscuring the description of the embodiments of the system.

It is intended that the terminology used in the description presented below be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable Computing Environment

Figure 1:
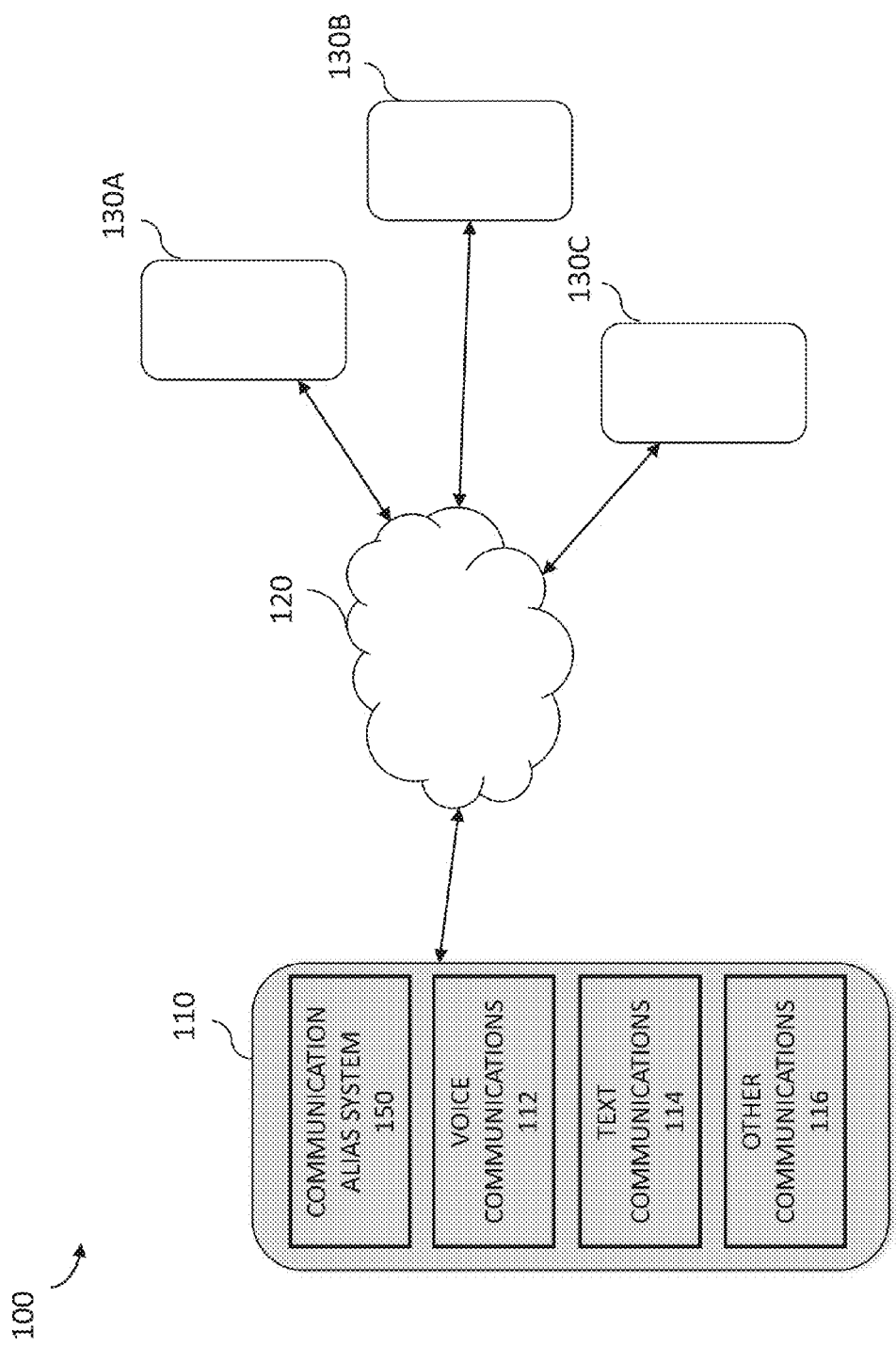
FIG. 1 is a block diagram illustrating a suitable computing environment.

FIG. 1 is a block diagram illustrating a suitable computing environment 100 within which a communication alias system 150 may operate to generate, create, provision and/or manage various distinct communication profiles for users of mobile devices. In some embodiments, the communication alias system 150, such as a system that provides a user with multiple aliases, personas, and/or communication profiles via which the user may communicate, is described. The communication alias system may be part of and/or supported by a mobile device 110 or other electronic computing device.

The mobile device 110, or electronic computing device, may be a tablet computer, smart-phone, net-book, mobile GPS navigation device, smart watch or other accessory, surface or tabletop computer, desktop computer, server computer, network connected television or television set-top box, on-board automobile (boat, RV, and so on) communications, entertainment, or computing device, gaming console, or any computing system or device. The mobile device 110 includes various hardware and/or software components, such as voice communications components 112, text messaging (or other messaging) components 114, application-based messaging or social network service applications 116, and so on.

For example, the mobile device 110 may include various human interface components, device components, memory, and so on. The mobile device 110 may communicate with other devices 130A-C over a network 120. The network 120 may be a Local Area Network (LAN), a Wide Area Network (WAN), the Internet, a telecommunications network, or other networks capable of facilitating various communications between computing devices.

FIG. 1 and the discussion herein provide a brief, general description of a suitable computing environment in which the system can be supported and implemented. Although not required, aspects of the communication alias system 150 are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible computer-readable storage media), including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Examples of the Communication Alias System

As described herein, in some embodiments, the communication alias system 150 establishes and provides multiple communication profiles for a user, such as various different communication profiles, each of which are associated with a unique phone number or other unique address or identifier (e.g., username, email address, app-based identifier, and so on). For example, a user may have a first profile (associated with a first phone number or identifier) that is used for work communications, a second profile (associated with a second phone number or identifier) that is used for personal communications, and a third profile (associated with a third phone number or identifier), that is used for unknown or infrequent communications.

The communication alias system 150, in some embodiments, includes various modules or components that provide multiple distinct communication profiles for a user of a mobile device, and perform various actions associated with the different communication profiles, including targeted messaging and alerts, location and/or time dependent profile generation, third-party provisioning of temporary profiles, and so on.

Figure 2:
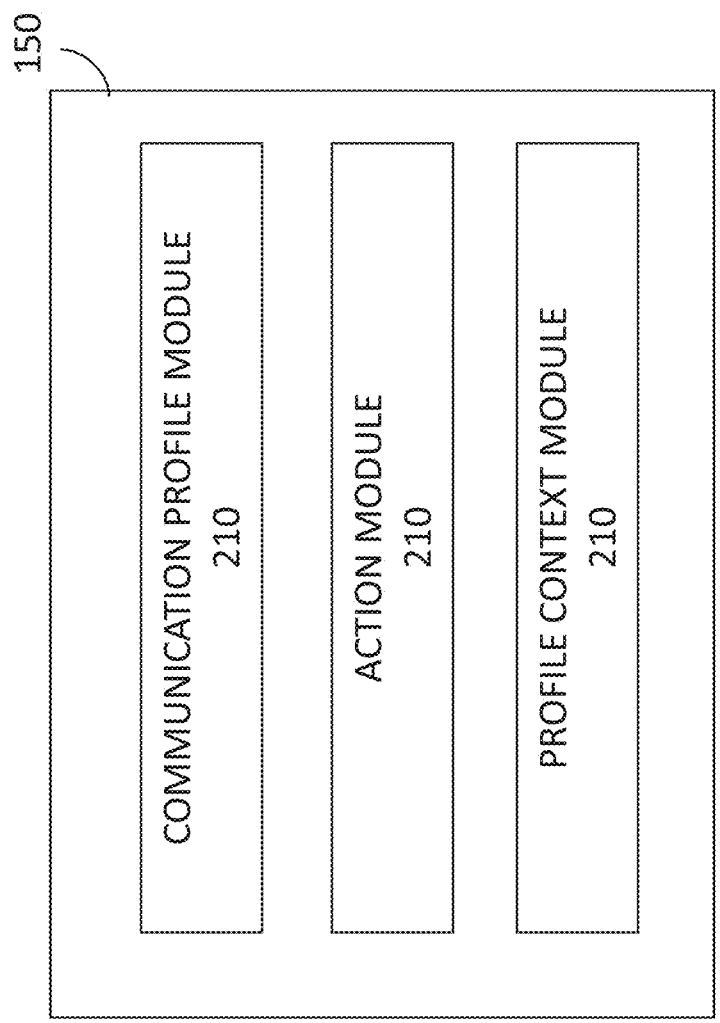
FIG. 2 is a block diagram illustrating components of a communication alias system.

FIG. 2 is a block diagram illustrating components of the communication alias system 150. One skilled in the art will appreciate that the communication alias system 150 may include functional modules are implemented with a combination of software (e.g., executable instructions, or computer code) and hardware (e.g., at least a memory and processor). Accordingly, as used herein, in some examples a module is a processor-implemented module and represents a computing device having a processor that is at least temporarily configured and/or programmed by executable instructions stored in memory to perform one or more of the particular functions that are described herein. For example, the communication alias system 150 may include a communication profile module 210, an action module 220, and a profile context module 230.

In some embodiments, the communication profile module 210 is configured and/or programmed to generate, provision, and/or manage multiple, distinct, communication profiles for the user of the mobile device 110. As described herein, a communication profile is a distinct profile associated with the user of the mobile device and includes a unique communication address to which communications (e.g., voice calls, text messages, app-based messages, and so on) are directed or targeted.

The communication profile module 210 may generate distinct communication profiles for the user of the mobile device 110 based on input received from the user of the mobile device, such as input requesting a new or newly-provisioned communication profile to be associated with certain types or communications or other users providing and receiving the communications. Therefore, a generated distinct communication profile may include a unique telephone number as the unique communication address to which communications targeted to the mobile device and received by the mobile device are directed, and profile type information that identifies a profile type for a given distinct communication profile.

The profile type of a communication profile may include a base or initial profile (e.g., a profile that includes a phone number provided by a carrier or mobile device operator), as well as other profile types, including work or professional profile types (e.g., a profile that communications with and is provisioned by enterprise systems of a user's place of business, school, organization, and so on), personal profile types (e.g., a profile set up and provisioned by the user for certain communications or users associated with the communications), and so on.

Therefore, the communication profile module 210 may generate and/or provision a variety of different communication profiles, where each of the profiles facilitate a unique set of communications. Example communication profiles include:

A communication profile that is associated with a phone number and is configured to facilitate voice communications and text messaging between the phone number and sender phone numbers located in a contacts database stored in the mobile device;

A communication profile that is associated with a phone number and is configured to facilitate voice communications and text messaging between the phone number and sender phone numbers unknown to the mobile device;

A communication profile that is associated with a phone number and is configured to facilitate text messaging between the phone number and sender phone numbers associated with other users;

A communication profile that is associated with a phone number and is configured to receive text messages that include sponsored messages from entities that provide goods or services of interest to the user;

A communication profile that is associated with a phone number and is configured to receive text messages that include sponsored messages from entities that provide goods or services unknown to be of interest to the user;

A communication profile that is associated with a work phone number and is configured to facilitate voice communications and text messaging between the phone number and sender phone numbers located in a work contacts database stored in the mobile device or an enterprise system associated with the work phone number; and so on.

In some embodiments, the action module 220 is configured and/or programmed to perform an action associated with providing information to the user of the mobile device 110 via a selected communication profile for the user of the mobile device 110. The action module 220 may select communication profiles via which to perform actions to display sponsored messages (e.g., alerts or other advertisements) to the user of the mobile device 110 based on the profile type information included in the communication profiles.

For example, the communication alias system 150, via input received from the user of the mobile device 110, may provision a communication profile to allow or deny sponsored or advertising based messaging. A communication profile, therefore, may include instructions to allow receipt of all sponsored content, allow receipt of pre-selected sponsored content (e.g., from entities or brands pre-selected or determined to be of interest to the user), and/or deny receipt of all sponsored content.

In some embodiments, the profile context module 230 is configured and/or programmed to determine a current or future profile context associated with the mobile device 110. The profile context module 230 may identify and/or determine a time period within which a temporary communication profile is to be an active profile has commenced, and/or may identify and/or determine a location (e.g., geographical location, certain building or establishment, and so on) at which a location-specific communication profile is to be an active profile. For example, the profile context module 230 may receive an indication that the mobile device 110 is at a location associated with a location-specific communication profile, and generate, provision, and/or set as "active" a communication profile for the location.

Thus, the communication alias system 150 includes various modules and/or components configured or programmed to generate and manage multiple communication profiles for a user of the mobile device 110. In some embodiments, the communication alias system 150 may enable the user to segregate, by facet, (i) visual, textual, and audio communications, related to each of the multiple facets of the user's life, and (ii) data or other information associated with capturing the user's activities, movements, and information (data) related to the multiple facets of the user's life.

In some embodiments, the communication alias system 150 is implemented as a mobile application that is resident on the mobile device 110. The communication alias system 150 enables an authorized party (e.g., user) the ability to establish and activate or deactivate multiple, unlimited unique software defined communication profiles (e.g., identities or personals) on the mobile device 110.

During implementation, the mobile application provides a user with the capability of establishing communication profiles, activating unique telephone number or other addresses for the communication profiles, performing audio communications (e.g., voice calls), visual communications (e.g., sending of video or images), and textual communications (e.g., text messaging) via the communication profiles. The mobile application may segregate data created, sent, received, and/or data consumed between the different communication profiles.

In establishing and provisioning the mobile application and various communication profiles, the communication alias system 150 may perform various functions, such as establish and/or access a customer/user account; establish, generate, provision, and/or set as active a communication profile; delete or set as inactive a communication profile; search for and/or select a telephone number or other communication address; purchase and/or active communications services associated with selected communication addresses, and so on.

Within a profile, the mobile application, via the communication alias system 150, may perform, or cause to perform, the following functions: establish telephone or other voice communications, send or initiate telephone calls, receive telephone calls. access voice mail messages, create a voice mail greeting, initiate audio communications, initiate visual communications, initiate textual communications, receive audio communications, receive visual communications, receive textual communications, send audio information, send visual information, send textual information, receive audio, visual, and textual information, create a local and/or remote data repository, store data in a data repository, access data stored in a data repository, segregate user created data, segregate user received data, segregate user consumed data, display user created data, display user consumed data, delete a telephone number, disconnect a telephone service, activate communication profile-specific audible sounds to indicate receipt of communications, play a communication profile-specific audible sound when an telephone call is received, play a communication profile-specific audible sound when a text message is received, play a communication profile-specific audible sound when an email message is received, play a communication profile-specific audible sound when a voice message is received, access a list of third-party vendors hosted within the mobile application, elect (e.g., opt in) to receive third-party vendor or sponsored alerts or notifications, whether textual, image-based, or audible, purchase goods and services from third-parties, and so on.

Figure 3:
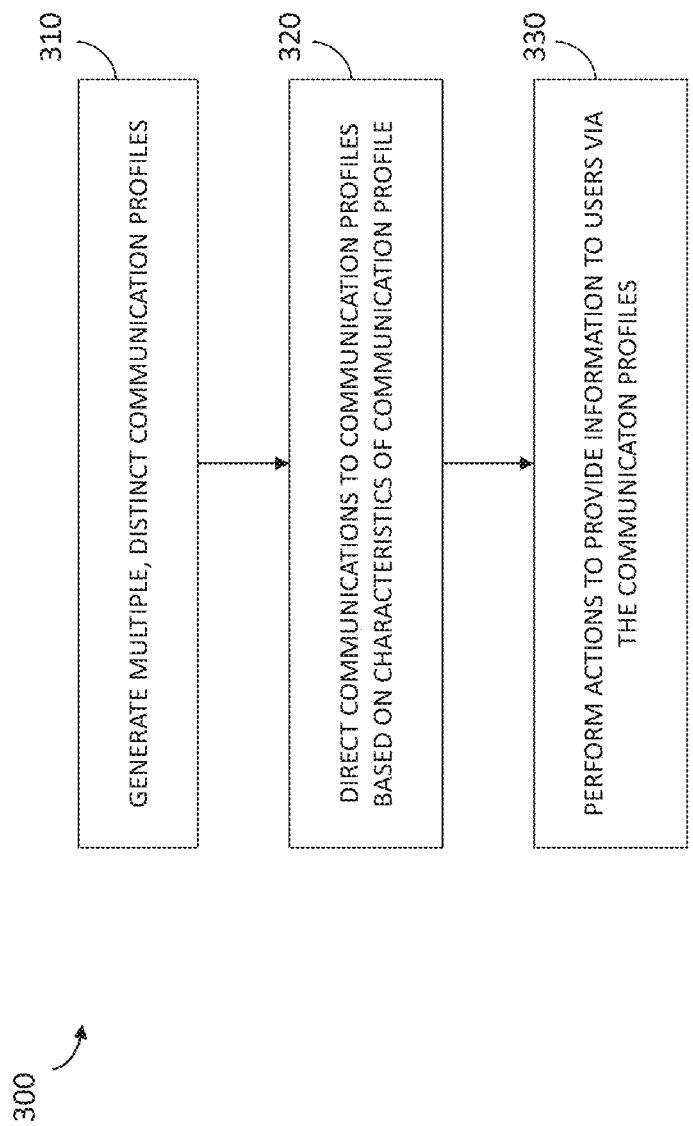
FIG. 3 is a flow diagram illustrating a method for managing multiple, distinct, communication profiles for a user of a mobile device.

As described herein, the communication alias system 150 performs various routines, algorithms, methods, or other processes to enable users to communicate via different personas or communication profiles from a single mobile device 110. FIG. 3 is a flow diagram illustrating a method 300 for managing multiple, distinct, communication profiles for a user of a mobile device. The method 300 may be performed by the communication alias system 150 and, accordingly, is described herein merely by way of reference thereto. It will be appreciated that the method 300 may be performed on any suitable hardware.

In operation 310, the communication alias system 150 generates and/or provisions multiple, distinct, communication profiles for the user of the mobile device, where a communication profile is a distinct profile associated with the user of the mobile device and includes a unique communication address to which communications are directed. For example, the communication profile module 210 may generate distinct communication profiles for the user of the mobile device 110 based on input received from the user of the mobile device, such as input requesting a new or newly-provisioned communication profile to be associated with certain types or communications or other users providing and receiving the communications.

In operation 320, the communication alias system 150 directs communications to the communication profiles based on characteristics of the communication profiles. For example, the communication profile module 210 may direct work-related voice calls to a work profile, personal-related text messages to a personal profile, sponsored alerts to a communication profile that accepts sponsored content or content from unknown numbers or entities, and so on.

In operation 330, the communication alias system 150 performs actions associated with providing information to the user of the mobile device via a selected communication profile for the user of the mobile device. For example, the action module 220 may select communication profiles via which to perform actions to display sponsored messages (e.g., alerts or other advertisements) to the user of the mobile device 110 based on the profile type information included in the communication profiles.

As described herein, the communication alias system 150 may render and present (or, cause the mobile device 110 display to present) various user interfaces configured to display information to users, receive input from users, and so on. FIGS. 4A-4G depict various user interfaces presented by the communication alias system 150.

Figure 4A:
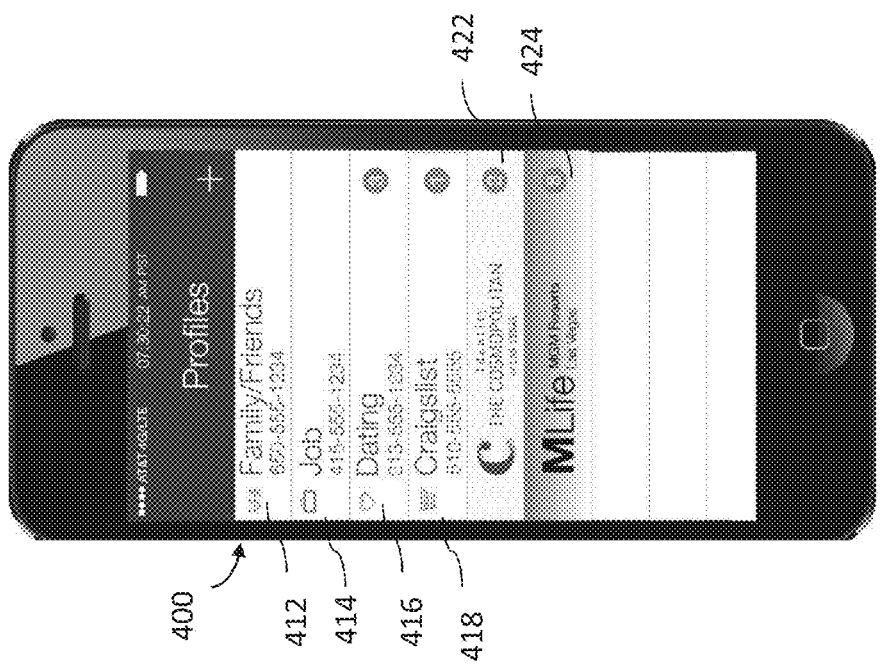
FIGS. 4A-4G are display diagrams illustrating various user interfaces presented by the communication alias system.

FIG. 4A depicts a home or base user interface 400 presented by the communication alias system 150, which presents information about the various different communication profiles for a user of the mobile device 110. For example the user interface displays information representing a family/friends communication profile 412, information representing a job or professional communication profile 414, information representing a dating or personal communication profile 416, information representing single entity ("Craigslist") communication profile 418, as well as information representing temporary, time- or location-based profiles 422, 424.

Figure 4C:
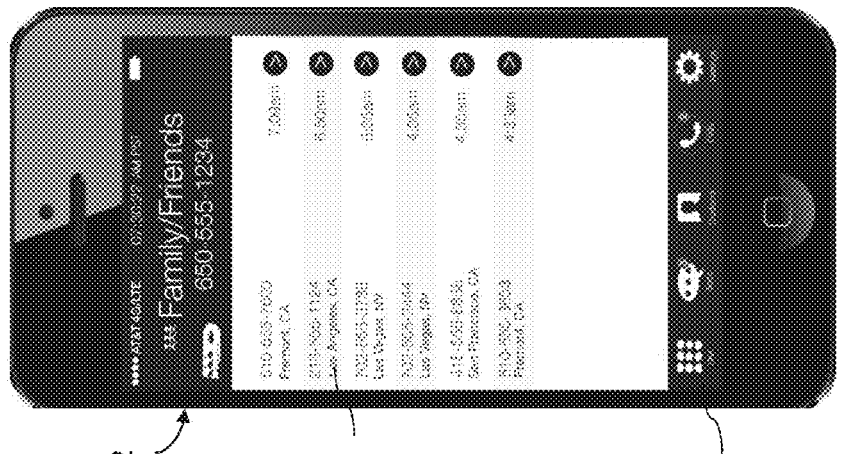
Figure 4B:
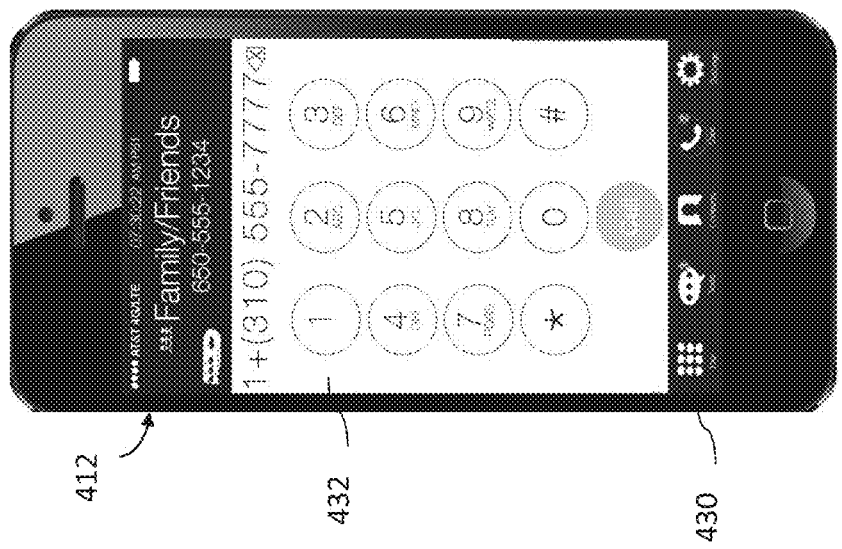

FIG. 4B depicts a user interface presenting various communication mechanisms 430, such as a dial pad or virtual keypad 432 within a selected communication profile, such as the family/friends communication profile 412. Via the user interface, the communication alias system 150 receives, via the keypad 432, input from a user of the mobile device 110, and initiates a voice call from the phone number ("650-555-1134") associated with the family/friends communication profile 412.

FIG. 4C depicts a user interface presenting a call log 434 or other list of recorded voice all information for calls placed and/or received within the family/friends communication profile 412. FIG. 4D depicts a user interface presenting various communication mechanisms 430, such as a text messaging log 436 or other list of recorded messages within the family/friends communication profile 412.

Figure 4E:
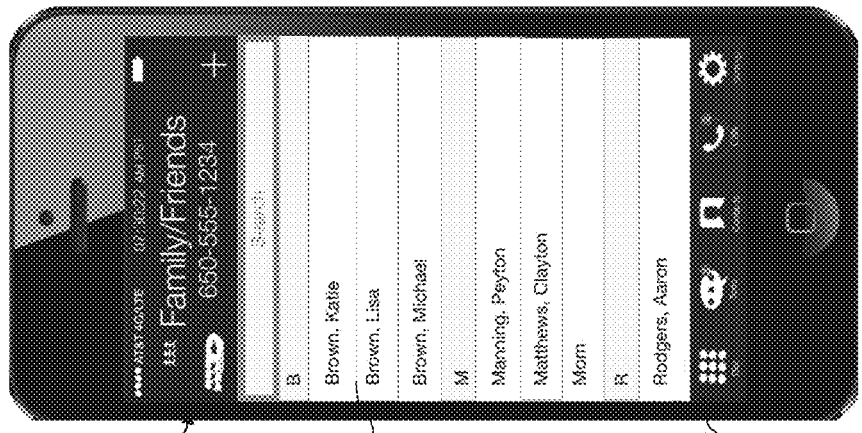
Figure 4D:
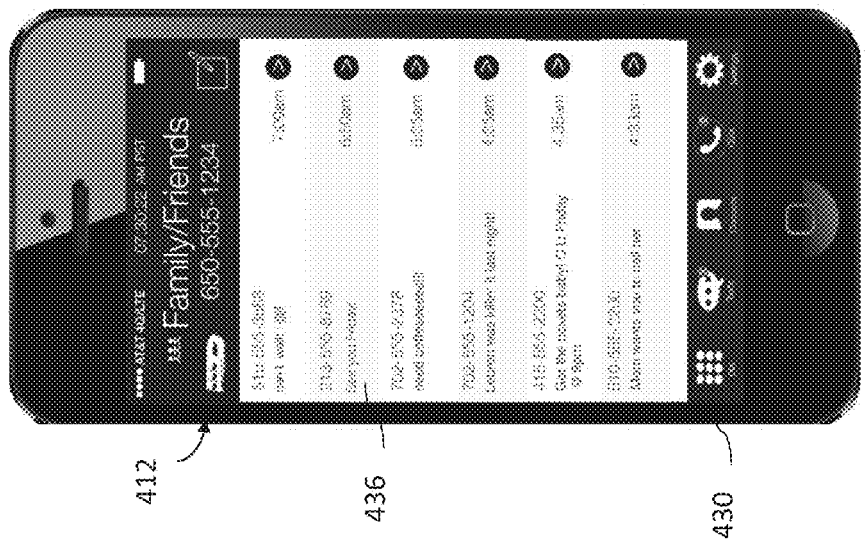

FIG. 4E depicts a user interface presenting various communication mechanisms 430, and a contact list of contact information 438 within the family/friends communication profile 412.

Figures 4F, 4G:

FIG. 4F depicts a user interface presenting a sponsored alert or promoted messages 442 within the text messaging log 436 or other list of recorded messages within the family/friends communication profile 412.

As described herein, the user, via the user interface depicted in FIG. 4G, may provide input associated with authorizing a brand, company, and/or entity 450 to send messages and alerts to the user via the family/friends communication profile 412, and may provide input, via input element 452, associated with setting parameters or filters for such messaging.

For example, the communication alias system 150, via the input element 452, may receive input identifying types of messaging (e.g., "announcements," "events," "coupons," and so on) to be sent to the user via the family/friends communication profile 412, a frequency (e.g., daily or weekly or monthly or event-based) of which to send sponsored messaging, and so on).

Of course, the communication alias system 150 may render, present, and/or cause to present a variety of other user interfaces that facilitate the display or presentation of information and/or content to a user of the mobile device 110, as well as the receipt of input from the user of the mobile device 110. Example user interfaces include:

A member login or sign up screen to create a new customer account, log into the application, reset the user's passkey, and so on;

A member profile screen to establish a new profile and/or display information about current profiles managed by the communication alias system 150;

A telephone dial pad screen to dial a telephone number, establish a telephone call, switch to a contacts screen, switch to the messaging screen, switch to a call log, switch to contact list, and so on;

A messaging screen to create a text message, view a list of text messages sent from and received by the mobile application within a time period (e.g., the past 90 days), which may include information, such as the originating or terminating telephone number, the date and time of day a message was sent from or received by the mobile application, and so on;

A contacts screen to create a new contact, search for an existing contact, edit a contact record, and so on;

A call log screen to display a list of calls placed or received in a certain time period (e.g., the past 30 days), select a call record to view details of the call, and so on;

A voicemail screen to view a list of voicemails, including the date and the time and the originating telephone number associated with the voicemails, cause a voicemail to be played, and so on;

A passcode or other security screen to receive input from a user associated with unlocking assess to the functions of the family/friends communication profile 412;

A new profile setup screen to create and save a new communication profile, including a user interface to receive input associated with locating a telephone number similar to the number desired by the user, selecting a new telephone number from a list matching the user's defined criteria, activating a new telephone number and associating it with the communication profile, and so on;

A settings screen to apply settings, such as direct all incoming calls to voicemail, changing a profile name, changing a telephone number or username associated with the profile, deleting a profile, adjusting the characteristics of the profile, and so on;

An alerts screen to display a list of third party sponsors, display a specific third party name from input received by the user, and so on;

An opt-in screen to display frequency options associated with receiving textual or audio or visual messages from third parties, display type of information options for the mobile application to receive textual or audio or visual messages from third parties via the communication profile, such as news, announcements, offers, contest results, sports results, and so on.

Thus, the communication alias system 150 may provide an interface or sub-system that facilitates the targeting of third-party messages or alerts to a specific communication profile of a user. The system 150 may act to direct certain messages (e.g., alerts, sponsored messages, location or time dependent messages, advertisements, video content and so on) to one or more of a user's communication profiles, such as to profiles selected by the user, enabling the user to control the communication profile to which certain types of messages and/or media are delivered or received.

As described herein, the communication alias system 150 may interact with voice communications components 112 of the mobile device 110, such as by communicating with an application protocol interface (API) to establish a communication link between the mobile application and an associated network. The mobile device 110 may send and receive telephone call control signaling information to/from the hosted network, which supports the mobile application when initiating and maintaining telephone call sessions between the mobile device 110 and other devices 130A-C.

Further, as described herein, the communication alias system 150 may interact with text communications components 114 of the mobile device 110, such as by communicating with an application protocol interface (API) to establish a communication link between the mobile application and a Short Message Service (SMS) and/or Multimedia Message Service (MMS) telecommunications network, for the routing and delivery of SMS and MMS messages. For example, the SMS and MMS telecommunications network may route and deliver all SMS and MMS messages received from the mobile application to destination addresses associated with the devices 130A-C.

As described herein, in some embodiments, the communication alias system facilitates the provisioning of temporal communication profiles, such as time-dependent and/or location-dependent communication profiles. FIG. 5 is a flow diagram illustrating a method 500 of facilitating temporary communications for a user of a mobile device. The method 500 may be performed by the communication alias system 150 and, accordingly, is described herein merely by way of reference thereto. It will be appreciated that the method 500 may be performed on any suitable hardware.

In operation 510, the communication alias system 150 receives an indication that the mobile device is at a certain location. For example, the communication alias system 150 may determine the mobile device 150 is at a certain geographical location or within a certain geofence, and/or that the mobile device 150 is at or in a certain building, establishment, event, or other physical structure.

The communication alias system 150 may receive the indication in a variety of ways. For example, the communication alias system 150 may receive user input of a capture or scan a barcode or image at certain location, may receive the indication from a GPS component of the mobile device 110, may receive a communication from an entity or organization associated with the location (e.g., upon the user registering for an event or conference at the location, upon the user checking into a hotel, and so on), and so on.

In operation 520, the communication alias system 150 generates a location-specific communication profile, wherein the location-specific communication profile includes a phone number or username associated with the user of the mobile device. For example, the profile context module 230 may receive an indication that the mobile device 110 is at a location associated with a location-specific communication profile, and generate, provision, and/or set as "active" a communication profile for the location. In operation 530, the communication alias system 150 directs communications associated with the location to the location-specific communication profile, as described herein.

In some embodiments, a third party may provision or generate a communication profile, such as a location-specific and/or time-specific profile, for a user within the communication alias system 150. For example, the system 150 may, with a user's consent, allow third parties to initiate the addition of a temporary, location- and/or time-dependent communication profile (following method 500), tailored to providing messages or other information to the user from the third party.

Figure 6:
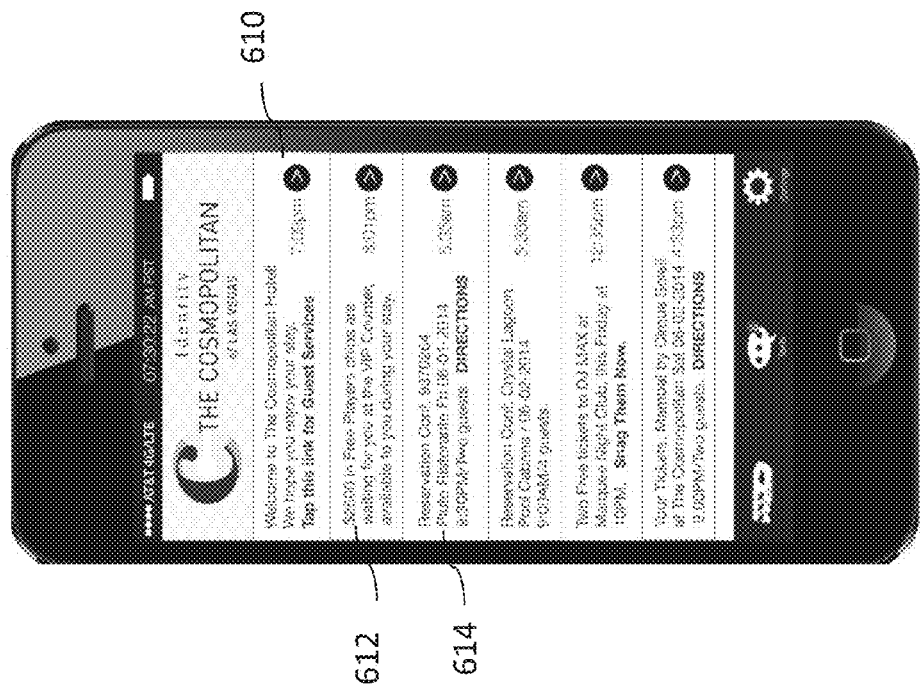
FIG. 6 is a display diagram illustrating a user interface that presents information sent to a communication profile.

The following example provides additional details for the third-party (in this case, a hotel) provisioning of a communication profile on a user's mobile device 110. Once a user enters a hotel, a new communication profile, as depicted in FIG. 6, is provisioned, via the alias communication system 150, on the guest's mobile device 110, and remains an active communication profile for the duration of the guest's stay.

The hotel guest may already be a member of the hotel's club and may therefore provide an alias telephone number, or a main mobile number (e.g., the number associated with a carrier provided subscription), to the hotel as part of the club registration. When the guest checks in, the hotel's registration system sends a new profile set up request (complete with check in and check out dates) to the mobile application, and the system 150 establishes and provisions the new temporary hotel alerts communication profile on the user's device 110. The communication profile may provide a user interface that displays registration information and links 610, coupons or other offers 612, information about associated events 614, and so on.

When the guest checks out, the profile is rendered inactive or removed by the communication alias system 150.

As described herein, in some embodiments, the user may hold up his/her phone to the hotel's QR code reader (attached to a hotel's POS system) and the mobile application will present the member's QR code, and/or via blue tooth and near field communication (NFC), the mobile device 110 may transmit the phone's UDID unique device ID, to the hotel's POS system, and the hotel will send the UDID and check in and check out dates to the system 150, which may then establish the temporary profile on the user's mobile device 110.

Further, the system 150 may determine the geographic location of the mobile device 110, and establish the communication profile for the duration of a trip, which then disappears once the user has left the location.

Therefore, the communication alias system 150, in some embodiments, provides multiple distinct communication profiles for a user of a mobile device, and performs various actions associated with the different communication profiles, including targeted messaging and alerts, location and time dependent profile generation, third-party provisioning of temporary profiles, and so on.

Suitable Computing System

Figure 7:
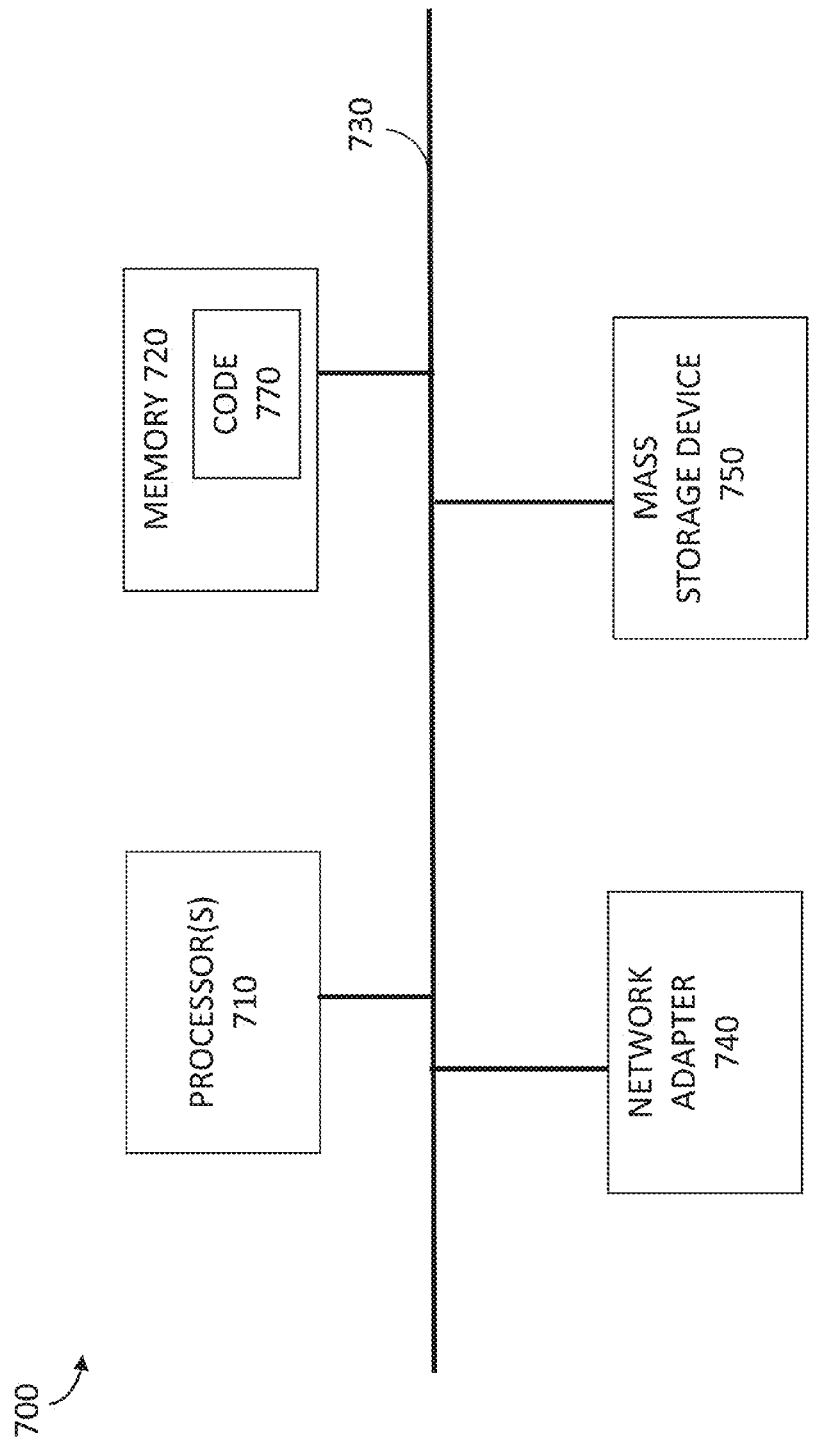
FIG. 7 is a block diagram illustrating suitable components of a computing device.

FIG. 7 illustrates a high-level block diagram showing an example architecture of a computer 700, which may represent any electronic device, such as a mobile device or a server, including any node within a cloud service as described herein, and which may implement the operations described above. The computer 700 includes one or more processors 710 and memory 720 coupled to an interconnect 730. The interconnect 730 may be an abstraction that represents any one or more separate physical buses, point to point connections, or both connected by appropriate bridges, adapters, or controllers. The interconnect 730, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 710 is/are the central processing unit (CPU) of the computer 700 and, thus, control the overall operation of the computer 700. In certain embodiments, the processor(s) 710 accomplish this by executing software or firmware stored in memory 720. The processor(s) 710 may be, or may include, one or more programmable general-purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices.

The memory 720 is or includes the main memory of the computer 700. The memory 720 represents any form of random access memory (RAM), read-only memory (ROM), flash memory, or the like, or a combination of such devices. In use, the memory 720 may contain code 770 containing instructions according to the techniques disclosed herein.

Also connected to the processor(s) 710 through the interconnect 730 are a network adapter 740 and a mass storage device 750. The network adapter 740 provides the computer 700 with the ability to communicate with remote devices over a network and may be, for example, an Ethernet adapter. The network adapter 740 may also provide the computer 700 with the ability to communicate with other computers.

The code 770 stored in memory 720 may be implemented as software and/or firmware to program the processor(s) 710 to carry out actions described above. In certain embodiments, such software or firmware may be initially provided to the computer 700 by downloading it from a remote system through the computer 700 (e.g., via network adapter 740).

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

While many embodiments described above employ software stored on the mobile device, the scripts and other software noted above may be hard coded into the mobile device (e.g. stored in EEPROM, PROM, etc.). Further, the above functionality may be implemented without scripts or other special modules.

The teachings of the system provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the system can be modified, if necessary, to employ the systems, functions, and concepts of the various references described above to provide yet further embodiments of the system.

These and other changes can be made to the system in light of the above Detailed Description. While the above description details certain embodiments of the system and describes the best mode contemplated, no matter how detailed the above appears in text, the system can be practiced in many ways. Details of the system may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. Accordingly, the inventor reserves the right to add additional claims after filing the application to pursue such additional claim forms for other aspects of the system.

I claim:

1. A system for managing communications associated with a user of a mobile device, the system comprising:
   a communication profile module that:
      manages multiple, distinct, communication profiles for the user of the mobile device, wherein a communication profile is a distinct profile associated with the user of the mobile device and includes a unique communication address to which communication is directed, generates a first communication profile that is associated with a first phone number and is configured to facilitate text messaging between the first phone number and sender phone numbers associated with other users;

generates a second communication profile that is associated with a second phone number and is configured to receive text messages that include sponsored messages from entities that provide goods or services of interest to the user; and generates a third communication profile that is associated with a third phone number and is configured to receive text messages that include sponsored messages from entities that provide goods or services, wherein the goods and services are unknown to be of interest to the user; and generates a fourth communication profile that is provisioned on behalf of a third party associated with a certain location of the mobile device, and is configured to receive text messages from the third party; and an action module that performs an action associated with providing information to the user of the mobile device via a selected communication profile for the user of the mobile device.

2. The system of claim 1, wherein the communication profile module generates distinct communication profiles for the user of the mobile device based on input received from the user of the mobile device;

wherein the generated distinct communication profiles each include:

a unique telephone number as the unique communication address to which communications targeted to the mobile device and received by the mobile device are directed; and profile type information that identifies a profile type for a given distinct communication profile; and wherein the action module selects communication profiles via which to perform actions to display sponsored messages to the user of the mobile device based on the profile type information included in the communication profiles.

3. The system of claim 1, wherein the first communication profile is associated with the first phone number and is configured to facilitate voice communications and text messaging between the first phone number and sender phone numbers located in a contacts database stored in the mobile device.

4. The system of claim 1, wherein each of the communication profiles include:

information identifying a telephone number to which voice calls and text messages are directed and from which voice calls and text messages originate; and information identifying a time period within which the communication profile is an active profile.

5. The system of claim 1, wherein each of the communication profiles include:

information identifying a telephone number to which voice calls and text messages are directed and from which voice calls and text messages originate; and information identifying a location at which the communication profile is an active profile.

6. The system of claim 1, wherein the communication profile module:

receives an indication that the mobile device is at a location associated with a location-specific communication profile; and generates a communication profile for the location that includes a phone number to which communications associated with the location are directed.

7. The system of claim 1, wherein the unique communication address is a phone number associated with voice communications and text communications or a username associated with application-based messaging communications.

8. A non-transitory computer-readable medium whose contents, when executed by a mobile device, cause the mobile device to perform operations for managing communications associated with a user of the mobile device, the operations comprising:

generating multiple, distinct, communication profiles for the user of the mobile device, wherein a communication profile is a distinct profile associated with the user of the mobile device, wherein a communication profile includes:

information identifying a telephone number to which voice calls and text messages are directed and from which voice calls and text messages originate, information identifying a location at which the communication profile is an active profile, and information identifying a time period within which the communication profile is an active profile when the mobile device is at the identified location; and wherein at least one of the communication profiles is provisioned on behalf of a third party associated with a certain location that includes the mobile device; and performing actions associated with providing information to the user of the mobile device via a selected communication profile for the user of the mobile device.

9. The computer-readable medium of claim 8, wherein the generated distinct communication profiles each include:

a unique telephone number as the unique communication address to which communications targeted to the mobile device and received by the mobile device are directed; and profile type information that identifies a profile type for a given distinct communication profile and a type of communications to be directed to the distinct communication profile.

10. The computer-readable medium of claim 8, wherein generating multiple, distinct, communication profiles for the user of the mobile device includes:

generating a first communication profile that is associated with a first phone number and is configured to facilitate voice communications and text messaging between the first phone number and sender phone numbers located in a contacts database stored in the mobile device; and generating a second communication profile that is associated with a second phone number and is configured to facilitate voice communications and text messaging between the second phone number and sender phone numbers unknown to the mobile device.

11. The computer-readable medium of claim 8, wherein generating multiple, distinct, communication profiles for the user of the mobile device includes:

generating a first communication profile that is associated with a first phone number and is configured to facilitate text messaging between the first phone number and sender phone numbers associated with other users; and generating a second communication profile that is associated with a second phone number and is configured to receive text messages that include sponsored messages from entities that provide goods or services of interest to the user.

12. The computer-readable medium of claim 8, wherein generating multiple, distinct, communication profiles for the user of the mobile device includes:

generating a communication profile that is associated with a phone number and is configured to receive text messages that include sponsored messages from entities that provide goods or services of interest to the user.

13. The computer-readable medium of claim 8, wherein generating multiple, distinct, communication profiles for the user of the mobile device includes:

receiving an indication that the mobile device is at a location associated with a location-specific communication profile; and generating a communication profile for the location that includes a phone number to which communications associated with the location are directed.

14. The computer-readable medium of claim 8, wherein the unique communication address is a phone number associated with voice communications and text communications or a username associated with application-based messaging communications.

15. A method performed by an application of a mobile device for establishing a communication profile associated with a user of the mobile device, the method comprising:

receiving an indication that the mobile device is at a certain location;

automatically generating a location-specific communication profile by provisioning the location-specific communication profile on behalf of a third party associated with the certain location, wherein the location-specific communication profile includes a phone number or username associated with the user of the mobile device; and directing communications associated with the location to the location-specific communication profile.

16. The method of claim 15, wherein receiving an indication that the mobile device is at a certain location includes receiving an indication that the mobile device is at a specific building or establishment, and wherein the location-specific communication profile is configured to only receive communications directly from the specific building or establishment while the mobile device is at the certain location.

17. The method of claim 15, wherein the certain location includes a hotel, automatically generating the location-specific communication profile to only communicate with the hotel, and wherein the communication profile includes information that identifies the location-specific communication profile as only being active while the user of the mobile device is checked into the hotel.

18. The method of claim 15, wherein the certain location is associated with an event or conference, and wherein the communication profile includes information that identifies the location-specific communication profile as only being active while the user of the mobile device is attending the event or conference at the certain location.

* * * * *

UNITED STATES PATENT AND TRADEMARK OFFICE
CERTIFICATE OF CORRECTION

PATENT NO. : 9,973,920 B2  
APPLICATION NO. : 14/933769  
DATED : May 15, 2018  
INVENTOR(S) : Michael Brinskele Page 1 of 1

It is certified that error appears in the above-identified patent and that said Letters Patent is hereby corrected as shown below:

On the Title Page

Under "(*) Notice:", Line 3, after "0 days." delete "days.".

In the Drawings

On sheet 3 of 10, in Figure 3, reference numeral 330, Line 2, delete "COMMUNICATON" and insert -- COMMUNICATION --, therefor.

On sheet 8 of 10, in Figure 5, reference numeral 530, Line 1, delete "COMMUNICTIONS" and insert -- COMMUNICATIONS --, therefor.

In the Specification

In Column 6, Line 28, delete "calls." and insert -- calls, --, therefor.

Signed and Sealed this  
Twenty-first Day of August, 2018

Andrei Iancu  
*Director of the United States Patent and Trademark Office*